United States Patent [19]
Thornburg

[11] 3,953,708
[45] Apr. 27, 1976

[54] THERMAL PRINTER USING AMORPHOUS SEMICONDUCTOR DEVICES

[75] Inventor: David D. Thornburg, Los Altos, Calif.

[73] Assignee: Xerox Corporation, Stamford, Conn.

[22] Filed: Apr. 25, 1975

[21] Appl. No.: 572,486

[52] U.S. Cl. ............................ 219/216; 219/543; 346/76 R
[51] Int. Cl.² .......................................... H05B 1/00
[58] Field of Search ........... 219/216, 543; 346/76 R; 250/317

[56] References Cited
UNITED STATES PATENTS

| | | | |
|---|---|---|---|
| 3,743,779 | 7/1973 | Hutner | 219/216 |
| 3,745,304 | 7/1973 | Hutner | 219/216 |
| 3,813,513 | 5/1974 | Vora et al. | 219/216 |

Primary Examiner—C. L. Albritton
Attorney, Agent, or Firm—John E. Beck; Terry J. Anderson; Leonard Zalman

[57] ABSTRACT

A thermal printer comprised of a shift register, a line buffer and a plurality of printheads in heat-transfer relationship with a heat-sensitive record medium. The shift register and line buffer are comprised of a plurality of stages or modules with each module having an amorphous semiconductor heating element that exhibits current controlled negative differential resistance in heat-transfer proximity to a heat-gated amorphous semiconductor threshold switch which has a V-I characteristic which is strongly temperature dependent. The printheads are comprised of the amorphous semiconductor heating elements. Data is stored in the shift register by means of a video data signal and two oppositely phased clock signals of an amplitude that will only bias a heated threshold switch to conduction, with transfer of data to the line buffer being achieved in a parallel format by a third properly phased clock signal. The data in the line buffer is transferred in parallel to the printheads which generate heat uniformly when in their low resistance state to thereby provide marking of the heat-sensitive record medium.

9 Claims, 7 Drawing Figures

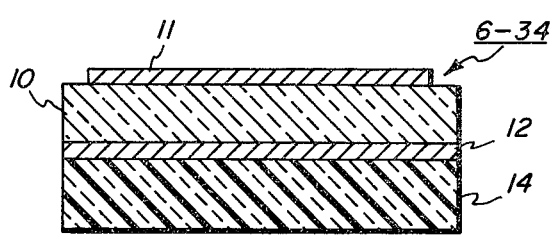
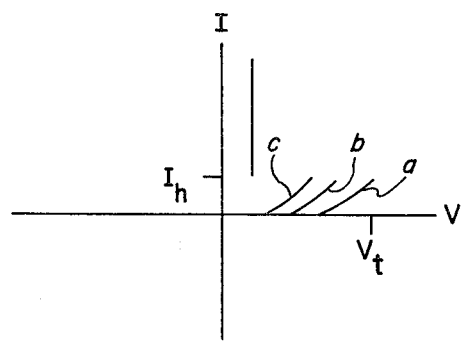
FIG. 4   FIG. 4A
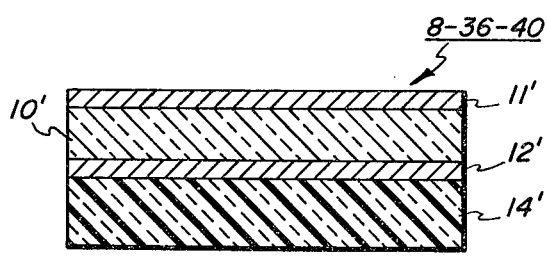
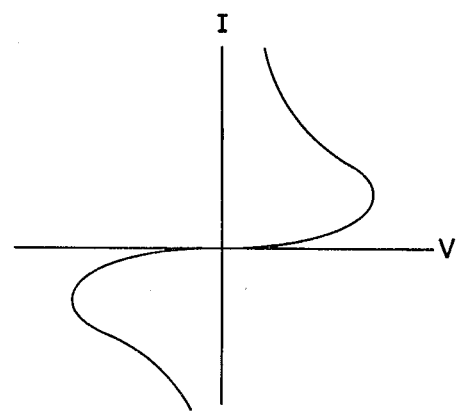
FIG. 5   FIG. 5A

THERMAL PRINTER USING AMORPHOUS SEMICONDUCTOR DEVICES

BACKGROUND OF THE INVENTION

Thermal printers are well known in which information is recorded on a thermo-sensitive record carrier, such as a sensitized paper, by means of selectively heated printheads in heat transfer relationship with the thermo-sensitive record carrier. The printheads generally consist of electrical resistors in which current is supplied in accordance with signals that are received from discrete storage and buffering circuitry contained in integrated circuit chips bonded to the printhead substrates. The potential mark resolution of these printers is on the order of 50 marks per inch and the number of external connections required for such thermal printers is fairly large, with a system which can print a 5 × 7 dot matrix requiring as many as 34 external connections. The fairly low resolution and the number of external connections, in addition to the need to bond integrated circuit chips to the printhead substrate, have substantially curtailed market acceptance of thermal printers.

OBJECTS OF THE INVENTION

It is therefore an object of the present invention to provide a thermal printer having increased mark resolution density.

It is a further object of the present invention to provide a thermal printer requiring fewer external connections.

It is a still further object of the present invention to provide a thermal printer which can be totally in monolithic form.

SUMMARY OF THE INVENTION

In accordance with the invention, there is provided a thermal printer having a potential mark resolution on the order of 200 marks per inch, with the marks being formed simultaneously in a parallel transfer format. During the time that one line of data is being written, the printer is accepting the next line of data. The printer can consist of a monolithic configuration of a shift register, a line storage buffer, and thermal printheads, with all data shifting, storing and printing functions being performed by thin film amorphous semiconductor heat-gated threshold switches and amorphous semiconductor current controlled negative differential resistance elements.

DESCRIPTION OF THE DRAWINGS

FIG. 4 is an elevation view of a threshold switch of the thermal printer of the invention.

FIG. 4a depicts the V-I characteristics of the switch of FIG. 4 for different temperatures.

FIG. 5 is an elevation view of a heating element of the thermal printer of the invention.

FIG. 5a depicts the V-I characteristics of the heating element of FIG. 5.

DESCRIPTION OF THE PREFERRED EMBODIMENTS

Figure 1:
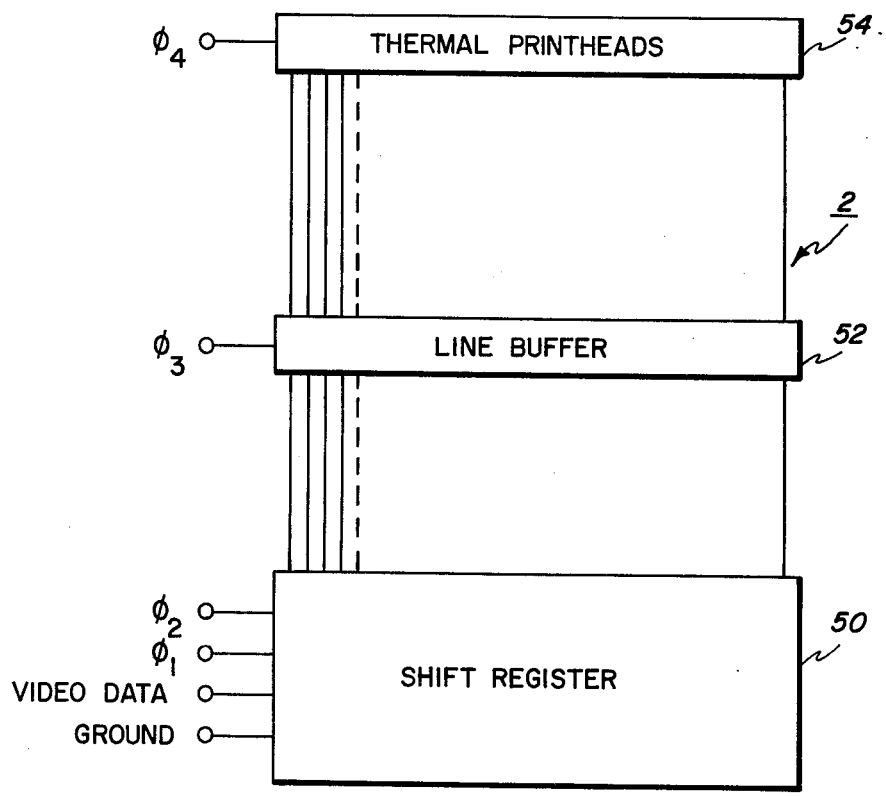
FIG. 1 is a block diagram representative of a thermal printer in accordance with the invention.
Figure 2:
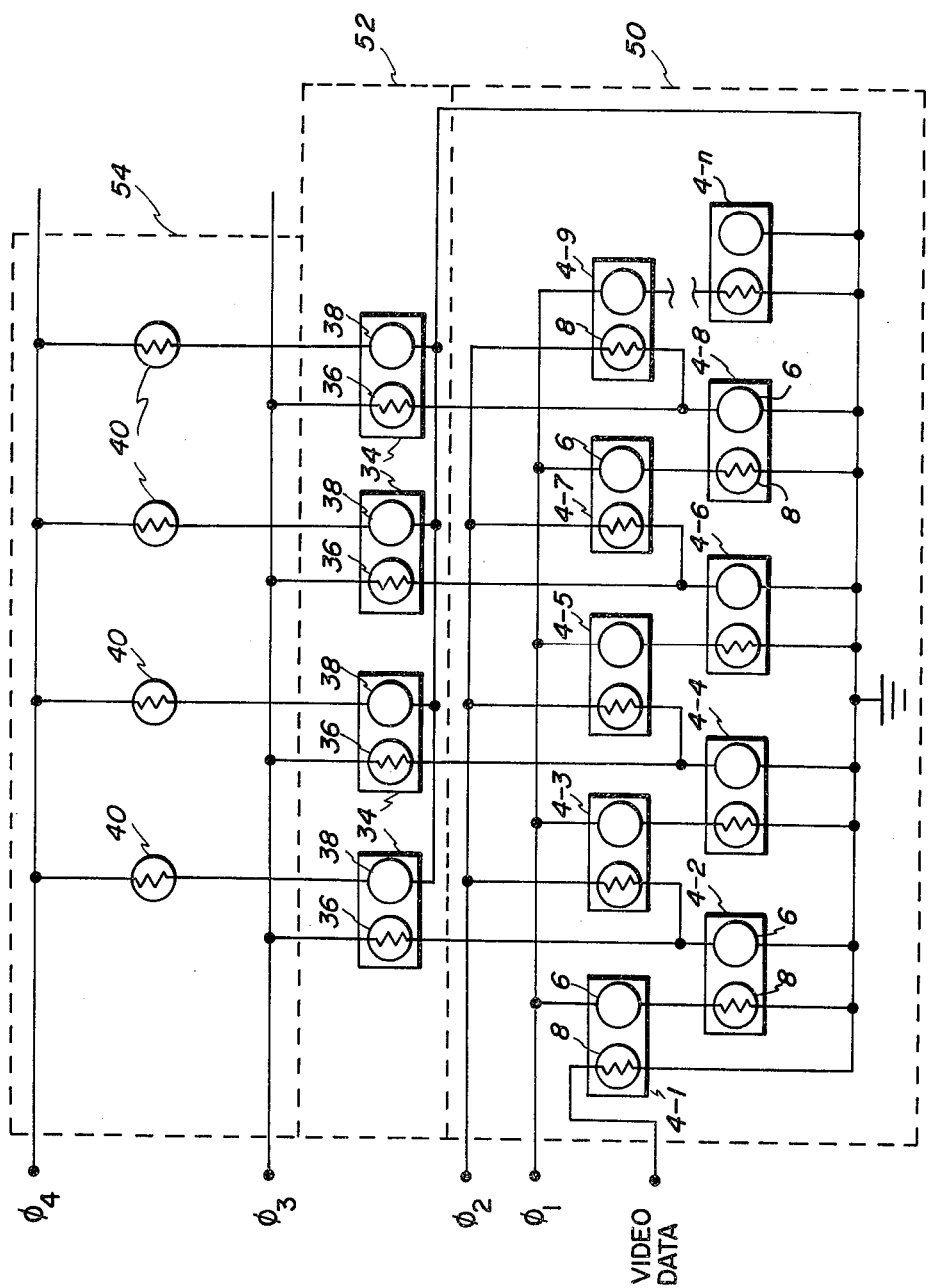
FIG. 2 is a schematic circuit diagram of the printer of FIG. 1.

Referring now to FIG. 1, there is shown a block diagram of a thermal printer 2 in accordance with the invention with the components of the blocks of FIG. 1 shown in schematic circuit form in FIG. 2. The printer 2 includes a shift register 50, a line buffer 52 and a bank of thermal printheads 54. The printer 2 requires only 6 external connections for any length video data bit string with one connection providing a reference potential, another connection providing the video data bit string, and the four remaining connections providing phase shifting and data transfer functions.

Figure 3:
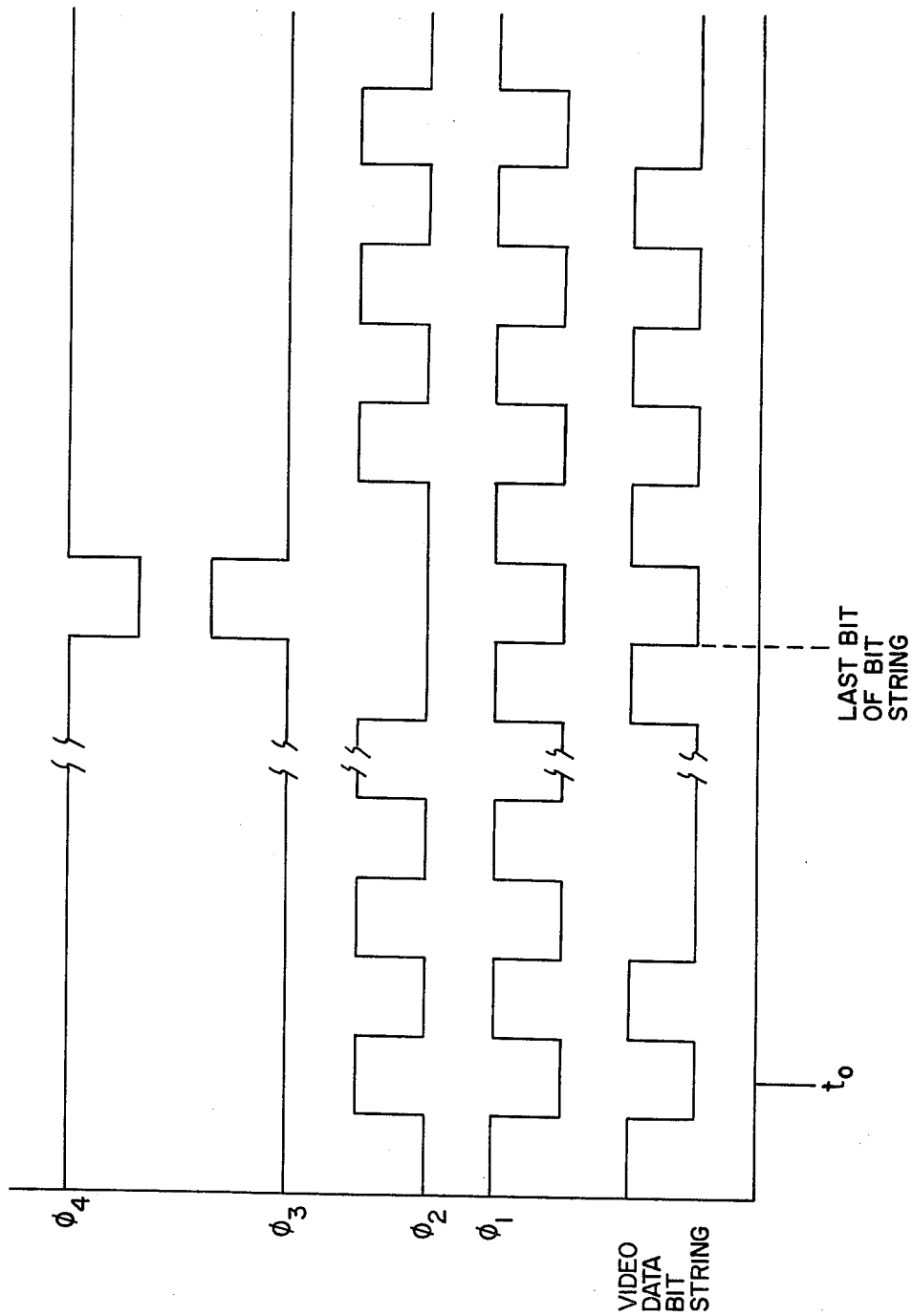
FIG. 3 depicts waveforms supplied to the devices of FIGS. 1 and 2.

Referring to FIG. 2, the shift register 50 includes an array of shift modules or stages 4-1, 4-2, 4-3, 4-4, 4-5, 4-6, 4-7, 4-8, 4-9 . . . 4-n, each comprised of a heat-gated threshold switch 6 and an adjacent heating element 8. The shift register 50 is driven by a two phase clock signal having waveforms $\phi_1$ and $\phi_2$, with one terminal of the threshold switches 6 of odd-numbered modules 4, i.e., modules 4-1, 4-3, 4-5, 4-7, 4-9 being supplied the $\phi_1$ waveform and with the ungrounded terminal of the threshold switches 6 of the even-numbered modules, i.e., 4-2, 4-4, 4-6, 4-8 being supplied the $\phi_2$ waveform through the heating element 8 of the next succeeding module. The other terminal of each threshold switch 6 of the odd-numbered modules is connected to the ungrounded terminal of the heating element 8 of the next succeeding module. The waveforms $\phi_1$ and $\phi_2$, as shown in FIG. 3, have a 180° phase shift therebetween.

The line buffer 52 includes a plurality of stages 34, each comprised of a heat-gated threshold switch 38 and an adjacent heating element 36. A terminal of each of the heating elements 36 is connected serially to the ungrounded terminal of the threshold switch 6 of different evennumbered shift modules 4 with the other terminal of the heating element 36 connected to receive the $\phi_3$ signal, which waveform is shown in FIG. 3. One terminal of each of the threshold switches 38 of the stages 34 is maintained at the reference potential (ground) with the other terminal of each of these threshold switches serially connected to one of the thermal printheads 40. The other terminal of each of the thermal printheads 40 is connected to receive the $\phi_4$ signal, which waveform is shown also in FIG. 3.

In accordance with the invention, the components of the devices 50, 52, and 54 are amorphous semiconductor devices. Specifically, each of the threshold switches 6 and 38 of the shift register 50 and of the line buffer 52 is comprised of a layer of amorphous semiconductor material 10 sandwiched between metallic electrodes 11 and 12, with insulating layer 14 providing support for electrode 12, as shown in FIG. 4. The electrode 11 may be for example a thin (0.25 micron) layer of chromium or aluminum and electrode 12 may be for example, an aluminum or chromium layer 0.5 microns thick. Since the threshold switches are not polarity sensitive, either of the electrodes 11 or 12 can be connected to receive the input signals specified in FIGS. 1 and 2. The amorphous semiconductor material 10 may consist of, but is not restricted to, the class of amorphous semiconductor materials known as chalcogenide glasses. Some examples of chalcogenide glasses which can be used are alloys consisting of, by atomic fraction, 40% arsenic, 60% tellurium; 40% arsenic, 40% selenium, 20% tellurium; 40% arsenic, 20% selenium, 40% tellurium;

48% tellurium, 30% arsenic, 12% silicon, 10% germanium; and numerous other alloys which could be chosen for their electrical properties and resistivity to crystallization. The amorphous semiconductor material 10 may be of any reasonable thickness and in this preferred embodiment would be on the order of 1 micron thick. Other amorphous semiconductor materials and electrode materials, and other material thicknesses, will be apparent to those skilled in the art.

Each of the heating elements 8 and 36 of the shift register 50 and the line buffer 52, and each of the printheads 40 can be comprised of a conventional resistance element or of a layer of amorphous semiconductor material 10' sandwiched between metallic electrodes 11' and 12' as shown in FIG. 5, with the insulating layer 14' once again being a support layer. The amorphous semiconductor material 10' and its thickness, and the materials and thicknesses of electrodes 11' and 12' may be the same as those of the threshold switches previously described. As is apparent, the devices of FIGS. 4 and 5 are physically similar, differing from each other only in the extent of the interface boundary between one of the electrodes of the device and the amorphous semiconductor material layer thereof.

As noted in copending U.S. patent application Ser. No. 412,211, filed Nov. 2, 1973, the threshold switches 6 and 38 will exhibit heat responsive threshold switching if the layer 10 of amorphous semiconductor material extends beyond the domain defined by the contact area between electrode 11 and layer 10, that is, layer 10 extends slightly beyond electrode 11, as shown in FIG. 4. An extension of 10 micrometers is sufficient, as explained in the aforementioned copending patent application. More specifically, layer 10 can be a disk having a radius of 0.041 centimeters and electrode 11 can be a disk having a radium of 0.040 centimeters. Referring to FIG. 4a, there is shown the V-I characteristics of each of the switches 6 and 38 for different ambient temperatures. As shown, all regions of V-I curve of the switches 6 and 38 are not accessible and, in fact, the V-I characteristics of each switch is comprised of regions of two types: a generally high resistance region from the origin to $V_t$ and then an abrupt transition to a low resistance branch of the curve which is not sustained below the current $I_h$. Curve $a$ of FIG. 4a represents the V-I characteristic of one of the threshold switches at room temperature (300°K), with curves $b$ and $c$ representing the V-I characteristics at temperatures of 305°K and 310°K, respectively. From FIG. 4a it is seen that the threshold voltage require to switch one of the switches 6 or 38 to its low resistance state decreases as the temperature of the threshold switch increases in the vicinity of room temperature. It is particularly noted that once a heated threshold switch switches to its low resistance state, it will remain in that state even if the switch is no longer heated, that is, even if the switch is allowed to cool to ambient temperature, provided that it remains biased by a current greater than the holding current corresponding to the threshold voltage at which it switched to its low resistance state. For example, if a switch 6 having the physical parameters specified is heated by a heating element to a temperature of 310°K, a clock voltage of 30 volts is sufficient both to switch the switch to its low resistance state and to maintain it in that state when it is no longer heated. A clock voltage of 30 volts is insufficient to switch any of the threshold switches to their low resistance state when they are at ambient temperature.

As also taught in the aforementioned copending patent application, the heating element of FIG. 5 will exhibit current controlled negative differential resistance when both the electrodes 11' and 12' are coextensive with the amorphous semiconductor layer 10'. Referring to FIG. 5a, there is shown the V-I characteristic of the heating element of FIG. 5, and as shown, all regions of the V-I characteristic curve are accessible. For positive currents, these regions are of three types, a generally high resistance region from the origin to the turnover voltage, $V_T$; a region of negative differential resistance; and a region of low resistance. This curve is typically symmetrical upon a reversal of the applied current. It has been found that when the amorphous semiconductor device of FIG. 5 is operating in its negative resistance mode it is uniformly heated, as opposed to having localized heated portions, and the device is therefore a reliable heating element for an associated device, such as a threshold switch disposed adjacent thereto, and as a thermal printhead. Specifically, uniform heating of the heating elements 8 and 36 is condusive to uniform heating of associated (adjacent) threshold switches 6 and 38. Also, uniform heating of printheads 40 will produce satisfactory marking of heat sensitive paper brought in contact therewith.

Referring again to FIGS. 1, 2 and 3, the amplitudes of the $\phi_1$ and $\phi_2$ waveforms are chosen so that the voltage across all of the threshold switches 6 will be below the room temperature threshold voltage when none of the heating elements 8 is carrying current. In this condition, all threshold switches 6 are in their high resistance state and negligible current flows through the heating elements 8. Suppose at time $t_0$, when the $\phi_1$ waveform is low and the $\phi_2$ waveform is high, that current is passed through the heating element 8 of module 4-1 in accordance with an increase in the amplitude of the video signal. This current flow will produce heating of threshold switch 6 of module 4-1 and reduce its threshold voltage but not to a value equal to, or below, the voltage of the $\phi_1$ waveform at that time. Suppose that the heating of threshold switch 6 of module 4-1 by heating element 8 of module 4-1 continues until the $\phi_1$ waveform voltage goes high, for example, to 30 volts. This $\phi_1$ voltage is sufficient to bias heated threshold switch 6 of module 4-1 to its low resistance state wherein current will flow through threshold switch 6 of module 4-1 and its series connected heating element 8 of module 4-2. Once threshold switch 6 of module 4-1 is in its low resistant state, the current flow through heating element 8 of module 4-1 can be stopped since there is sufficient voltage across threshold switch 6 of module 4-1 to maintain it in its low resistance state in the absence of external heating. The current flowing through heating element 8 of module 4-2 will cause the threshold switch 6 of module 4-2 to heat up so that when the $\phi_2$ waveform voltage goes high (and the $\phi_1$ voltage concurrently goes low) threshold switch 6 of module 4-2 will be biased to its low resistance state through the heating element 8 of module 4-3, thereby conducting current and providing heating of threshold switch 6 of module 4-3 due to current flow in heating element 8 of module 4-3. If the fall time of the $\phi_1$ waveform is rapid, for example, 10 microseconds, threshold switch 6 of module 4-3 will not have been heated enough to switch to its low resistant state. When the $\phi_1$ waveform voltage goes high again and the $\phi_2$ waveform voltage goes low, threshold switch 6 of module 4-1 will stay off due to its having cooled to about ambient temperature but now heated threshold switch 6 of module 4-3 will conduct and provide heating of threshold switch 6 of module 4-4 by heating resistor 8 of module 4-4. In this manner, a single bit, or a video bit string, such as shown in FIG. 3, can be clocked through or into the shift register 50. The periods of the $\phi_1$ and $\phi_2$ waveforms can be on the order of 100 microseconds so that when, for example, the $\phi_1$ voltage goes high and switch 6 of module 4-3 is being heated by heating element 8 of that module, that threshold switch 6 of module 4-1 will have cooled to about room temperature. If an entire binary word, such as the video input string of FIG. 3, is clocked into the input, this binary word would be loaded into the shift register and scanned along at a rate of 1 bit per clock cycle. By monitoring the state of switch 6 of module 4-n an entire data bit string can be read out in parallel and transferred to the line buffer 52.

As noted, maximum clock rates will be governed by the thermal time constants of the system, but there is no minimum clock rate. If one clock is held high and the other low, the data in the register 50 will be stored indefinitely. Erasure can be performed by either shifting out the contents of the register 50 or by putting the voltage of both clock inputs low. Since the threshold switches 6 are unipolar, any polarity clock signals can be used. In order for a heating element to provide sufficient heating of the associated threshold switch of its module, the heating element must be situated in close proximity to its associated threshold switch, a spacing of 10-25 microns being suggested.

After the last bit position of the video signal is clocked into the shift register 50, the $\phi_3$ signal, rather than the $\phi_2$ signal, is raised high. This permits the heating elements 36 that are connected in series with threshold switches 6 of the shift register 50 that are in a low resistance state to draw current and thus heat their associated threshold switches 38 to thereby provide a parallel transfer of data to the line buffer 52. When the $\phi_1$ signal goes high again, the $\phi_3$ signal goes low and the $\phi_4$ signal goes high, thus simultaneously applying power to all those printheads 40 which are connected to heated threshold switches 38, thus heating these accessed printheads. The accessed printheads will remain hot while the next line is being read in and during this time heat sensitive paper is marked by the accessed printheads with advancement of the paper being synchronized in a conventional manner with the line printing rate.

The thermal printer of the present invention has the advantage that the threshold switching elements thereof, the heating elements thereof and the printheads thereof can be formed simultaneously on a common insulating (glass) substrate in integrated circuit form by a series of conventional process steps. The process is initiated by successive vapor deposition of, for example, a 0.25 micron layer of chromium, followed by deposition on the chromium layer of a 1 micron layer of amorphous chalcogenide material, such as, for example, a-As$_2$SeTe$_2$, with subsequent vapor deposition on the amorphous chalcogenide layer of, for example, a 0.5 micron layer of aluminum. Using conventional photolithographic techniques, the aluminum layer is provided with a resist mask over the desired area of the heating elements, the printheads, and the threshold switches, and the metallic layers and semiconductor material layer between the masked regions is acid etched down to the glass substrate. Following further masking, a portion of the exposed electrode of each threshold switch is removed so that the amorphous chalcogenide material is not coextensive with the electrode. Metallic connectors may then be deposited in a conventional manner to provide the desired interconnections between the shift register 50, the line buffer 52 and the printheads 54, with electrical insulation being provided where needed at connector crossover points.

A critical feature of the integrated circuit layout is that the thermal coupling between a heating element and its associated threshold switches be strong, while the coupling between a heating element and an unassociated threshold switch be weak. If a 10-25 micron spacing is used for the strong thermal link and the devices are arranged on an array of 100 per inch, the thermal coupling distance to the wrong switch will be 10-25 times greater than that to the "correct" switch. This should result in a several order of magnitude difference in temperature rise between a desired threshold switch and its nearest neighbor.

I claim:

1. A thermal printer for marking a heat-sensitive material comprising:
    a shift register having a plurality of stages,
    a line buffer having a plurality of stages,
    a plurality of heat generating print heads in heat transfer relationship with the heat-sensitive material,
    each of said stages of both said shift register and said line buffer being comprised of a heat responsive amorphous semiconductor threshold switch and an adjacent heating element, said threshold switches each being comprised of a body of amorphous semiconductor material with opposed surfaces of said body of amorphous semiconductor material bounded by first and second electrodes with said body extending slightly beyond one of said electrodes such that each of said threshold switches has a voltage-current characteristic with a generally high resistance region to a threshold voltage and an abrupt transition to a low resistance region with said threshold voltage decreasing as the ambient temperature of said threshold switch increases,
    first means for coupling said stages of said shift register together, for coupling each of said stages of said line buffer to a different stage of said shift register, and for coupling each of said print heads to a different one of said stages of said line buffer, and
    second means for supply phased waveforms to said shift register, said line buffer and said print heads such that a video bit string supplied to the first stage of said shift register can be stored in said shift register, then transferred in parallel to said line buffer, and then transferred in parallel to said print heads to heat selected print heads in accordance with said video bit string to thereby cause marking of said heat-sensitive material in accordance with said video bit string.

2. The thermal printer of claim 1 wherein each of said heating elements and each of said print heads is comprised of a body of amorphous semiconductor material with opposed surfaces of said body of amorphous semiconductor material bounded by first and second electrodes with both said electrodes having a coextensive boundary with said body such that each of said heating elements and each of said print heads has a voltage-current characteristic with a first region of generally high resistance, a second region of negative differential resistance, and a third region of low resistance.

3. The thermal printer of claim 1 wherein said first means includes first coupling means for connecting the threshold switch of each stage of said shift register to the heating element of another stage of said shift register, second coupling means for serially connecting the threshold switches of different stages of said shift register to different ones of said heating elements of said stages of said line buffer, and third coupling means for serially connecting each of said print heads to the threshold switch of a different one of said stages of said line buffer.

4. The thermal printer of claim 1 wherein said second means includes (1) third means for supplying a first voltage waveform of a first phase to the threshold switches of alternate stages of said shift register and for supplying a second voltage waveform of a phase opposite to that of said first phase to the threshold switches of said stages of said shift register intermediate said alternate stages of said shift register, said voltage waveforms having at least high amplitude portions and low amplitude portions with only said high amplitude portions being effective to switch a heated threshold switch to its low resistance state, to thereby store in said shift register said video bit string supplied to the first stage of said shift register, (2) fourth means for supplying a third voltage waveform having a high amplitude portion effective to switch only a heated threshold switch to its low resistance state to circuits containing said heating elements of said stages of said line buffer, said high amplitude portion of said third voltage occurring only when said first and second waveforms are at their low amplitude to thereby effect a parallel transfer of said video bit string from said shift register to said line buffer, and (3) fifth means for supplying a fourth voltage waveform having a high amplitude portion when said third voltage waveform has a low amplitude to circuits containing said print heads to thereby effect heating of said print heads that carry current when said high amplitude portion of said fourth voltage waveform is supplied to those circuits to thereby effect marking of the heat-sensitive material in accordance with the video bit string.

5. The thermal printer of claim 1 wherein said shift register, said line buffer and said print heads are a monolithic structure.

6. The thermal printer of claim 2 wherein said first means includes first coupling means for connecting the threshold switch of each stage of said shift register to the heating element of another stage of said shift register, second coupling means for serially connecting the threshold switches of different stages of said shift register to different ones of said heating elements of said stages of said line buffer, and third coupling means for serially connecting each of said print heads to the threshold switch of a different one of said stages of said line buffer.

7. The thermal printer of claim 6 wherein said second means includes (1) third means for supplying a first voltage waveform of a first phase to the threshold switches of alternate stages of said shift register and for supplying a second voltage waveform of a phase opposite to that of said first phase to the threshold switches of said stages of said shift register intermediate said alternate stages of said shift register, said voltage waveforms having at least high amplitude portions and low amplitude portions with only said high amplitude portions being effective to switch a heated threshold switch to its low resistance state, to thereby store in said shift register said video bit string supplied to the first stage of said shift register, (2) fourth means for supplying a third voltage waveform having a high amplitude portion effective to switch only a heated threshold switch to its low resistance state to circuits containing said heating elements of said stages of said line buffer, said high amplitude portion of said third voltage occurring only when said first and second waveforms are at their low amplitude to thereby effect a parallel transfer of said video bit string from said shift register to said line buffer, and (3) fifth means for supplying a fourth voltage waveform having a high amplitude portion when said third voltage waveform has a low amplitude to circuits containing said print heads to thereby effect heating of said print heads that carry current when said high amplitude portion of said fourth voltage waveform is supplied to those circuits to thereby effect marking of the heat-sensitive material in accordance with the video bit string.

8. The thermal printer of claim 3 wherein said second means includes (1) third means for supplying a first voltage waveform of a first phase to the threshold switches of alternate stages of said shift register and for supplying a second voltage waveform of a phase opposite to that of said first phase to the threshold switches of said stages of said shift register intermediate said alternate stages of said shift register, said voltage waveforms having at least high amplitude portions and low amplitude portions with only said high amplitude portions being effective to switch a heated threshold switch to its low resistance state, to thereby store in said shift register said video bit string supplied to the first stage of said shift register, (2) fourth means for supplying a third voltage waveform having a high amplitude portion effective to switch only a heated threshold switch to its low resistance state to circuits containing said heating elements of said stages of said line buffer, said high amplitude portion of said third voltage occurring only when said first and second waveforms are at their low amplitude to thereby effect a parallel transfer of said video bit string from said shift register to said line buffer, and (3) fifth means for supplying a fourth voltage waveform having a high amplitude portion when said third voltage waveform has a low amplitude to circuits containing said print heads to thereby effect heating of said print heads that carry current when said high amplitude portion of said fourth voltage waveform is supplied to those circuits to thereby effect marking of the heat-sensitive material in accordance with the video bit string.

9. The thermal printer of claim 1 wherein said amorphous semiconductor material is a chalcogenide glass.

* * * * *